US007596662B2

(12) United States Patent
Makineni et al.

(10) Patent No.: US 7,596,662 B2
(45) Date of Patent: Sep. 29, 2009

(54) SELECTIVE STORAGE OF DATA IN LEVELS OF A CACHE MEMORY

(75) Inventors: Srihari Makineni, Portland, OR (US); Jaideep Moses, Portland, OR (US); Ravishankar Iyer, Portland, OR (US); Ramesh Illikkal, Portland, OR (US); Don Newell, Portland, OR (US); Li Zhao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 11/513,554

(22) Filed: Aug. 31, 2006

(65) Prior Publication Data

US 2008/0059707 A1   Mar. 6, 2008

(51) Int. Cl.
*G06F 12/00* (2006.01)
(52) U.S. Cl. .................. 711/122; 711/133; 711/141
(58) Field of Classification Search .............. 711/122, 711/133, 141
See application file for complete search history.

(56) References Cited

U.S. PATENT DOCUMENTS

| 6,381,715 B1* | 4/2002 | Bauman et al. .......... 714/718 |
| 6,393,522 B1* | 5/2002 | Campbell .............. 711/120 |
| 7,281,092 B2* | 10/2007 | Rajamony et al. ........ 711/122 |
| 7,301,448 B1* | 11/2007 | Usery et al. ............ 340/506 |
| 2008/0320228 A1* | 12/2008 | Brunheroto et al. ...... 711/137 |

OTHER PUBLICATIONS

U.S. Appl. No. 11/503,777, filed Aug. 14, 2006, entitled, "A Selectively Inclusive Cache Architecture," by Ravishankar Iyer, Li Zhao, Srihari Makineni and Donald Newell.

U.S. Appl. No. 11/503,633, filed Aug. 14, 2006, entitled, "Providing Quality Of Service (QoS) For Cache Architectures Using Priority Information," by Li Zhao, Ravishankar Iyer, Ramesh Illikkal, Srihari Makineni and Donald Newell.

* cited by examiner

*Primary Examiner*—Hyung S Sough
*Assistant Examiner*—Mehdi Namazi
(74) *Attorney, Agent, or Firm*—Trop, Pruner & Hu, P.C.

(57) ABSTRACT

In one embodiment, the present invention includes a method for incrementing a counter value associated with a cache line if the cache line is inserted into a first level cache, and storing the cache line into a second level cache coupled to the first level cache or a third level cache coupled to the second level cache based on the counter value, after eviction from the first level cache. Other embodiments are described and claimed.

22 Claims, 5 Drawing Sheets

SELECTIVE STORAGE OF DATA IN LEVELS OF A CACHE MEMORY

BACKGROUND

Chip multiprocessors (CMPs) that include multiple processing cores on a single die can improve system performance. Such CMPs and other multiprocessor systems are often used for highly-threaded (or parallel) applications and to support throughput computing. To support high performance throughput computing, an on-die cache/memory hierarchy should support many cores/threads efficiently. In a multiple-core platform, cache space available per hardware thread is not growing at near the same rate as the compute density due to die area and cost constraints. Further, a large number of cores, e.g., in-order cores, results in increased memory pressure. Cache hierarchies allow for faster access latencies to the most currently used data, but also introduce the possibility of redundant information, thereby wasting cache space. While a CMP architecture enables usage of multiple levels of shared caches, traditional policies such as inclusive caches and central directories are not satisfactory.

There are typically three inclusion policies for a cache hierarchy: inclusive, non-inclusive, and exclusive. Inclusive caches cause redundant information to be stored across the cache hierarchy, which leads to inefficient space usage. Non-inclusive caches do not have to enforce inclusion, however, such policies send snoop traffic to lower-level caches even when the line does not exist in a higher-level cache (note that lower caches are close to cores and higher caches are close to main memory). In an exclusive cache hierarchy, data is present in only a single cache. While efficient in usage of space, such a policy increases coherency messages and causes data to be moved constantly between multiple levels of caches.

DETAILED DESCRIPTION

In various embodiments, cache lines evicted from a first cache in a multi-level cache hierarchy having an exclusive policy may be selectively cached in a next level of the cache or instead in a lower level, depending on the likelihood that the data of the cache line will be touched again by the first cache before it is sent out of the cache hierarchy. In this way, an evicted cache line from a first cache may bypass storage in the next level where it is likely that such line will not be requested by the first cache again before it is evicted out of the next level cache. In this way, reduced evictions of more useful data from the next level cache can be avoided. Such policies may be extended to multiple levels of a cache hierarchy, such that upon eviction from a current cache level, the cache line may either be stored in the next level cache or bypass storage in the next level cache, based on the likelihood of whether the data will be used again by the current cache level.

Note that a large percentage of cache lines evicted from a first cache level may not be accessed again before eviction from a next cache level. Accordingly, embodiments may avoid caching these lines in the next cache level to avoid eviction of more useful cache lines therein. In various implementations, cache lines that evict other cache lines from a next level of a hierarchy but are not again accessed by the lower level cache, may be referred to as "polluter" lines. Note that such polluter lines can negatively impact performance, i.e., cache efficiency in several ways. First, upon insertion into a given cache level, a more useful cache line may be evicted. Second, the recency of insertion of such a polluter line can cause less recently used, more useful lines to be selected for replacement. Accordingly, misses per instruction (MPI) performance can be negatively impacted. By using embodiments of the present invention, however, lines that have potential to evict more useful cache lines can be identified and mechanisms may be implemented to prevent storage of these so-called polluter lines in a next level of a cache hierarchy.

As will be described herein, various hardware, software, firmware and/or combinations thereof may be implemented to perform methods in accordance with embodiments of the present invention. Furthermore, while described herein particularly with regard to a multi-level cache architecture such as may be present in a multi-core processor, it is to be understood that the scope of the present invention is not so limited and embodiments may be implemented in other systems including multiple caches.

Figure 1:
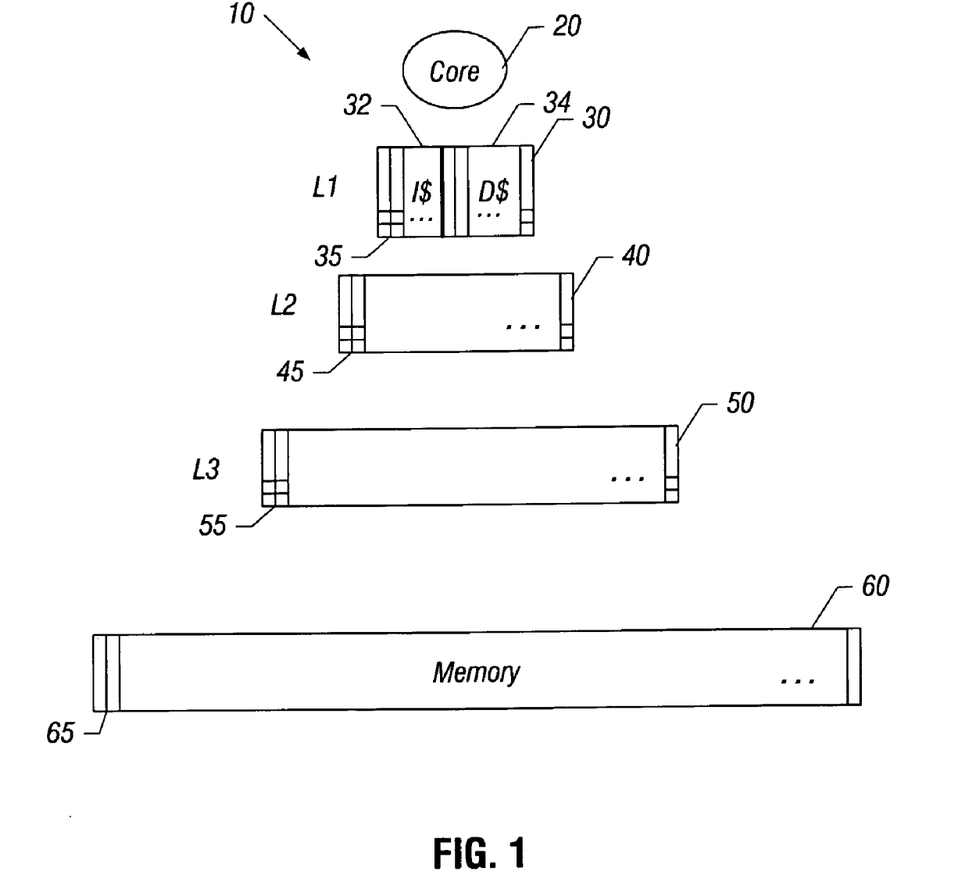
FIG. 1 is block diagram of a portion of a system in accordance with one embodiment of the present invention.

Referring now to FIG. 1, shown is a block diagram of a portion of a system in accordance with one embodiment of the present invention. As shown in FIG. 1, system 10 includes various processing and storage components. Specifically, system 10 includes a core 20 which may be a core of a multi-core or many-core processor. Alternately, core 20 may be the single core of a single-core processor. In the embodiment of FIG. 1, a memory hierarchy is coupled to core 20. More specifically, a level one (L1) cache 30 is coupled to core 20. In various embodiments, first level cache 30 may be integrated on the same die as core 20. In the embodiment of FIG. 1, first level cache 30 may include an instruction cache (I-cache) 32 portion and a data cache (D-cache) portion 34, although in other embodiments a unified cache memory may be present. As will be described further below, each cache line or entry within first level cache 30 may include a counter field 35 to enable identification of polluter lines. Counter field 35, as discussed below, may be used in determining whether, and where, to selectively cache the corresponding line in a higher cache level upon eviction from first level cache 30. Of course additional portions or fields may be present, such as a state field and a data field, within each cache line.

As shown in FIG. 1, first level cache 30 may be coupled to a level 2 (L2) cache 40, which may be a unified cache memory that stores both instruction information and data information. In various embodiments, second level cache 40 may include a counter field 45 that includes the same count information as described above with regard to counter field 35 of first level cache 30. Additional levels of a memory hierarchy may be coupled to second level cache 40. Specifically, as shown in FIG. 1 a level 3 (L3) cache 50 may be coupled to second level cache 40. Third level cache 50 may further include a counter field 55 including the same count information. In turn, third level cache 50, which may also be a unified cache memory, may be coupled to a memory 60, which may be a system memory, such as a dynamic random access memory (DRAM), in various embodiments. Data stored in memory 60 may also have a counter field 65 associated therewith.

While shown with this particular implementation in the embodiment of FIG. 1, it is to be understood the scope of the present invention is not limited in this regard. Furthermore, while shown collectively as a portion of a system 10, in various embodiments multiple levels of the memory hierarchy may be located in different parts of a system. For example, in some implementations first level cache 30 and second level cache 40 may be integrated on a common die with one or more cores 20. In some implementations first level cache 30 and second level cache 40 may be private caches associated with core 20 (e.g., a lowest-level and mid-level cache), while in other embodiments at least second level cache 40, along with third level cache 50, may be shared caches. Still further, in some implementations third level cache 50 may act as a last level cache (LLC), although the scope of the present invention is not limited in this regard.

Figure 2:
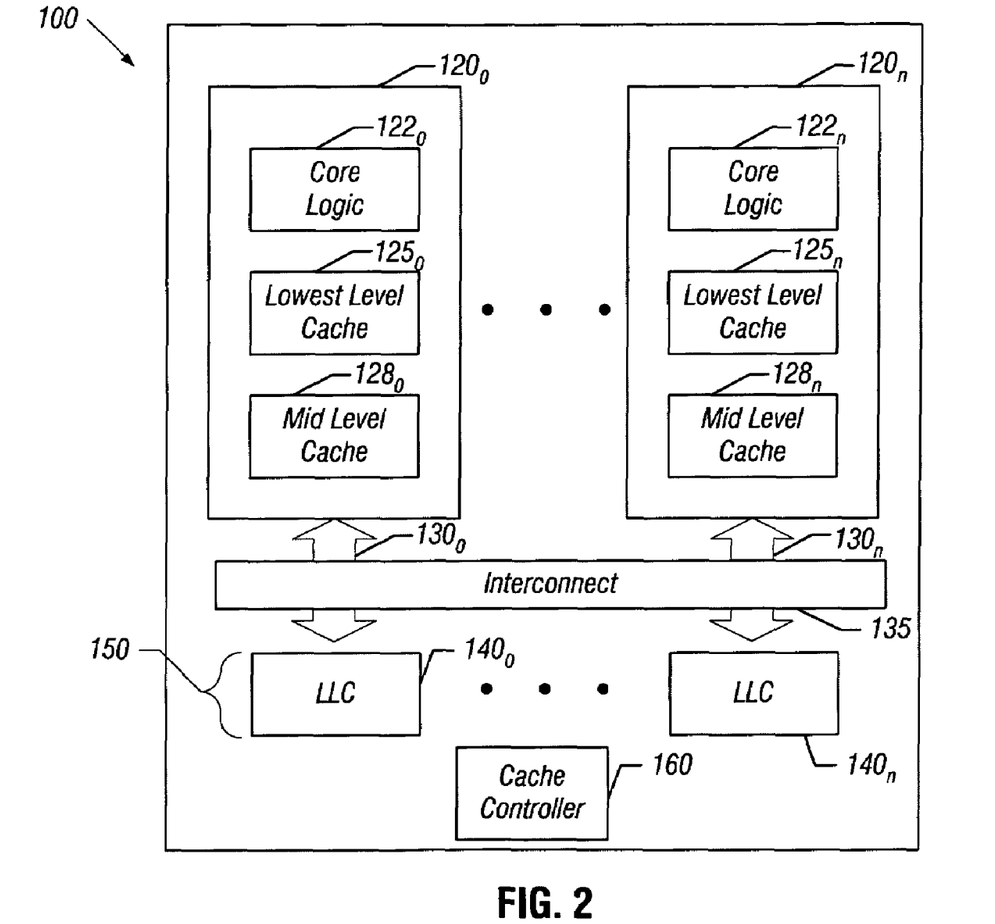
FIG. 2 is a block diagram of a processor in accordance with one embodiment of the present invention.

Referring now to FIG. 2, shown is a block diagram of a processor in accordance with one embodiment of the present invention. As shown in FIG. 2, processor 100 may be a multi-core processor including a plurality of processor cores $120_0$-$120_n$ (generically core 120). As shown in FIG. 2, in addition to core logic $122_0$-$122_n$ (generically core logic 122), each core may include multiple levels of a cache hierarchy. Specifically, as shown in FIG. 2 each core 120 may include a lowest-level cache $125_0$-$125_n$ (generically cache 125). In one embodiment, cache 125 may correspond to a level zero (L0) cache, although the scope of the present invention is not so limited. Each core 120 may further include a mid-level cache $128_0$-$128_n$ (generically cache 128). Mid-level cache 128 may correspond to an L1 cache, in some embodiments.

Processor 100 may further include a last-level cache (LLC) 150 formed of a plurality of banks $140_0$-$140_n$ (generically bank or portion 140). LLC 150 may be a higher-level cache coupled to cores 120 via an interconnect 135. As shown in FIG. 2, each core 120 may be coupled to interconnect 135 via a link $130_0$-$130_n$ (generically link 130). LLC 150 may act as a shared memory. That is, LLC 150 may be shared among the various cores 120 within processor 100. In contrast, the multi-level cache (MLC) hierarchy including lowest-level cache 125 and mid-level cache 128 may be formed of private caches, in which data is stored only for the associated core 120. As further shown in FIG. 2, a cache controller 160 may be present to control caching operations.

During operation, memory requests from execution units of a given core (which may be part of core logic 122) may first access the lowest level of the cache hierarchy before looking up any other caches within a system. Accordingly, for improved performance frequently accessed data may be present in the lowest possible cache level, i.e., cache 125. If the requested data is not present in cache 125, cache 128 may next be accessed to determine if the data is present there. In the embodiment shown in FIG. 2, each mid-level cache 128 is a final lookup point for each core 120 before a request is issued to LLC 150.

In various embodiments, processor 100 may selectively cache data in at least certain levels of the cache hierarchy. That is, when data is evicted from a current level in the hierarchy, it may be selectively cached in the next cache level (i.e., next higher cache level) if the cache line has been identified as a non-polluter line. However, if the evicted cache line has been identified as a polluter line, the cache line may be instead cached in a more distant portion of the memory hierarchy. For example, in the context of a three-level cache hierarchy, eviction of a polluter cache line from a first level cache may be selectively cached in a third level cache. In contrast, a non-polluter cache line evicted from the first level cache may be selectively cached in a second level cache. In this way, polluter cache lines may avoid eviction of more useful cache lines from higher levels of a cache hierarchy.

Note that in various embodiments, when data is provided into the cache hierarchy, it may be directly stored in lowest-level cache 125. That is, incoming data obtained from more distant portions of a memory hierarchy, e.g., system memory or even from disk, may be directly inserted into lowest-level cache 125. In this way, the overhead associated with moving the data first into LLC 150, then mid-level cache 128, and finally into lowest-level cache 125 may be avoided. However, in other implementations data may flow, virtually simultaneously, into each of these levels of the cache hierarchy. Similar policies on eviction of data, e.g., from lowest-level cache 125 may be implemented, such that depending on a state of the cache line (e.g., its identification as a polluter or non-polluter), the cache line may be directly stored in either of mid-level cache 128 or LLC 150. Accordingly, in various embodiments selective caching enables cache lines to be moved directly between multiple cache levels that are not in direct communication with each other. As one example, data from LLC 150 may be directly read into lowest-level cache 125, effectively bypassing mid-level cache 128. Similar bypassing of mid-level cache 128 may occur on eviction of a cache line from lowest-level cache 125. While described with this particular implementation in the embodiment of FIG. 2, it is to be understood that the scope of the present invention is not so limited and processors may have different configurations in other embodiments. For example, while shown with a bank or slice implementation in the embodiment of FIG. 2, it is to be understood the scope of the present invention is not limited in this regard. Further while not shown in FIG. 2, it is to be understood that each cache level may include one or more counter fields in accordance with an embodiment of the present invention.

Figure 3:
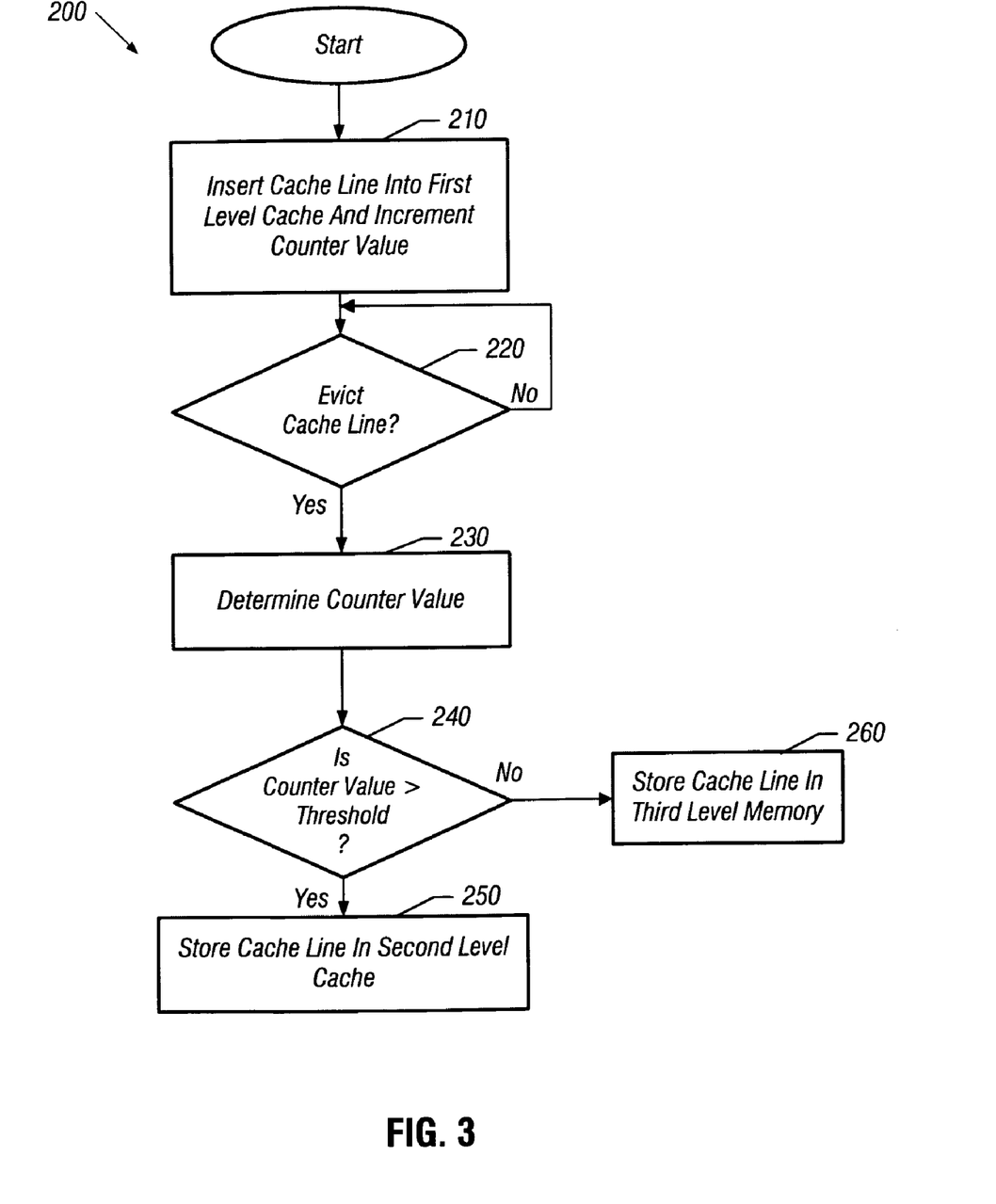
FIG. 3 is a flow diagram of a method in accordance with one embodiment of the present invention.

Referring now to FIG. 3, shown is a flow diagram of a method in accordance with one embodiment of the present invention. Specifically, FIG. 3 shows a method 200, which may be used in insertion and eviction of a cache line from a first level cache. In various embodiments, method 200 may be implemented, for example, in a cache controller. However, the scope of the present invention is not so limited, and in other implementations method 200 may be performed in various hardware, software or firmware (or combinations thereof).

As shown in FIG. 3, method 200 may begin by inserting a cache line into a first level cache (block 210). This cache line may be inserted from various locations, such as a higher level cache (either a next level cache or a more distant cache level) or directly from memory. Also at block 210, a counter value may be incremented. More specifically, a counter which may be present in a state portion of the cache line that is inserted into the first level cache may be incremented. In one embodiment, this counter may be a two-bit counter which is used to count the number of times the given cache line has been inserted into the first level cache. The value of this counter may provide an indication of the relative usefulness of the data of the cache line. That is, in various embodiments the value of the counter may be used to determine whether a given cache line is a polluter line. Accordingly, when a given cache line is read into the first level cache, its associated counter may be incremented. Note that because in one embodiment, the counter is a two-bit counter, the count value may saturate at a level of three. Of course, in other implementations finer-grained control may be realized by adding additional bits to this counter. In the discussion herein, the counter may be referred to as a pollution counter, and may correspond to, e.g., counter field 35 of FIG. 1.

Still referring to FIG. 3, at a later time when the first level cache is at capacity and additional data is to be written thereto, it may be determined whether a cache line is to be evicted (diamond 220). For example, in various embodiments a least recently used (LRU)-type algorithm may be used to determine an appropriate cache line for eviction. If no eviction is to occur, diamond 220 loops back on itself. When a given cache line is selected for eviction, its counter value may be determined (block 230). Based on this counter value, it may be determined whether the counter value for the cache line is greater than a threshold value (diamond 240). That is, a threshold level may be set that is used to determine whether the corresponding cache line is considered to be a polluter line. In various embodiments, the threshold level may be controlled, e.g., by operating system (OS) support. In other embodiments, a user may control the threshold level. Still further, the threshold level may be automatically adjusted based on a given workload, and analysis of data that is being identified as polluter/non-polluter status.

While the scope of the present invention is not limited in this regard, in an embodiment in which a two-bit counter exists, this threshold level may be set at one. Accordingly, if at diamond 240 it is determined that the counter value is greater than the threshold value, control passes to block 250. At block 250, the cache line may be stored in a next cache level, i.e., a second level cache. If instead at diamond 240 it is determined that the count value is not greater than the threshold, control passes to block 260. At block 260, the second level cache may be bypassed, and instead the evicted cache line may be stored in a third level cache. While described in the embodiment of FIG. 3 with respect to a first level cache, it is to be understood that the scope of the present invention is not limited in this regard. That is, in various implementations multiple counter fields may be present per cache line, each associated with a given cache level such that upon insertion into the given cache level, the value of its corresponding counter field may be incremented. Accordingly, method 200 set forth in FIG. 3 may be applicable to any cache level. Furthermore, other variations are possible with regard to method 200. For example, instead of determining if a count value is greater than a threshold level, instead it may be determined whether the count value is at least equal to a threshold level. Still further, in other embodiments instead of incrementing the count value on insertions, a count value may instead be decremented and accordingly, the comparison to a threshold may determine whether the count value is, e.g., less than or equal to the threshold value. Of course, further implementations are possible.

Figure 4:
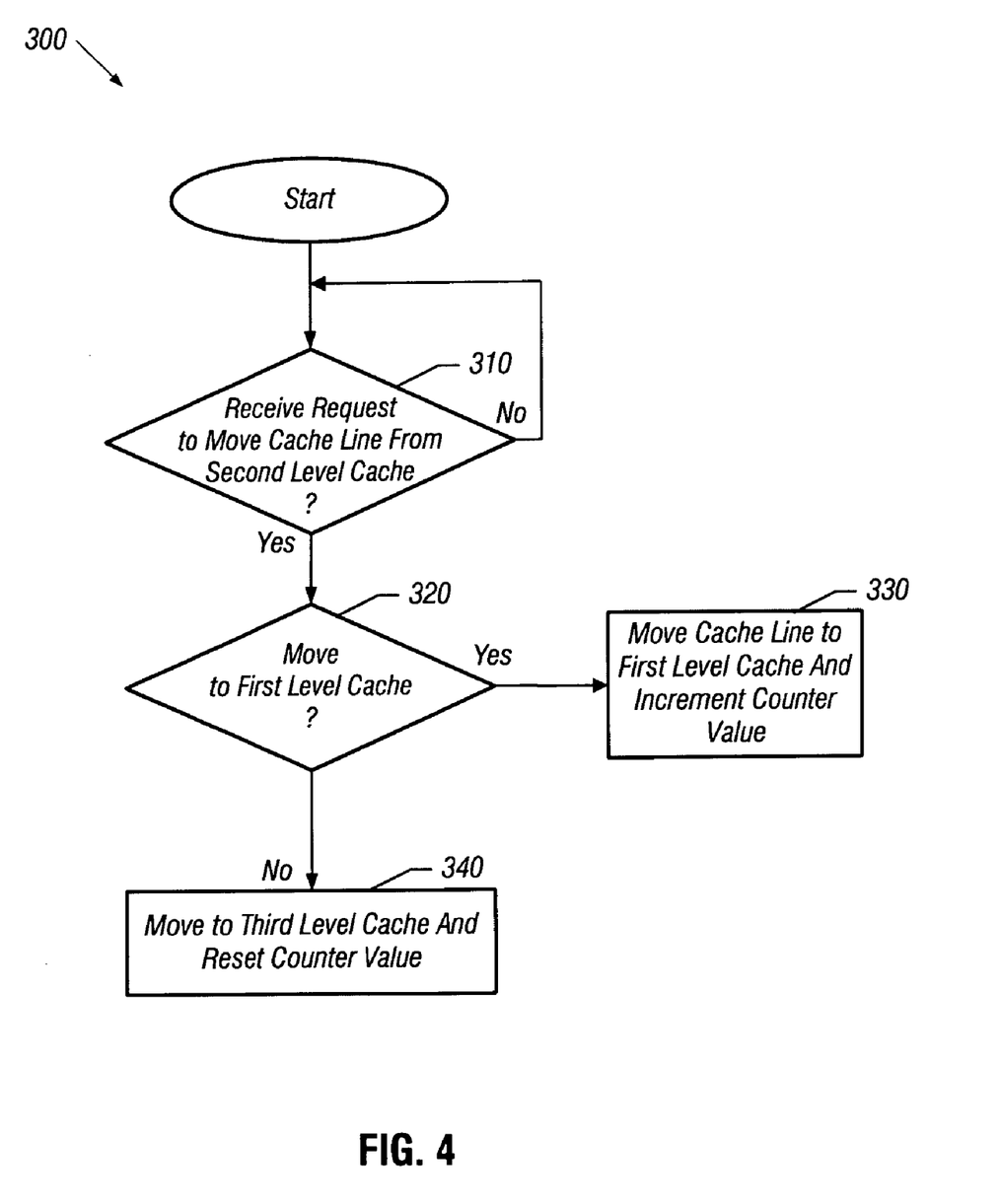
FIG. 4 is a flow diagram of a method in accordance with another embodiment of the present invention.

Referring now to FIG. 4, shown is a flow diagram of a method in accordance with another embodiment of the present invention. As shown in FIG. 4, method 300 may be used to control movement of a cache line from a second level cache, e.g., a cache level between two other caches. In various implementations, method 300 may be performed by cache controller or other control logic associated with a memory hierarchy. Method 300 may be performed when a given cache line in a second level cache is to be moved. Method 300 may begin by determining if a request is received to move a cache line from the second level cache (diamond 310). If no such request is received, diamond 310 may loop back on itself. When such a request is received, control passes to diamond 320, where it may be determined whether the cache line is to be moved to the first level cache. For example, on a request for the data by a core coupled to the first level cache, such movement may occur. If so, control passes to block 330. At block 330, the cache line is moved to the first level cache. Furthermore, the counter value associated with the cache line may be incremented to indicate that the line has been placed in the first level cache.

If instead at diamond 320, it is determined that the cache line is not to be moved to the first level cache, instead it is moved to the third level cache (block 340). For example, on a capacity eviction from the second level cache, e.g., pursuant to an LRU policy, such movement may occur. Furthermore, when the cache line is moved to the third level cache, i.e., as a result of eviction from second level cache, the counter value associated with the cache line may be reset (also at block 340). In this way, this count value may be indicative of a polluter line. That is, because this cache line was evicted, e.g., as being the least recently used cache line, it is identified as a polluter line. Thus, to qualify as a non-polluter line, the cache line would need to be promoted to the first level cache and have its counter incremented sufficient times to qualify as a non-polluter line. For example, with reference to a threshold level of one, the cache line would need to be promoted to the first level cache, have its count value incremented, moved to another cache and then back to the first level cache to have its counter incremented yet again, such that its count value may exceed the threshold level of one.

Figure 5:
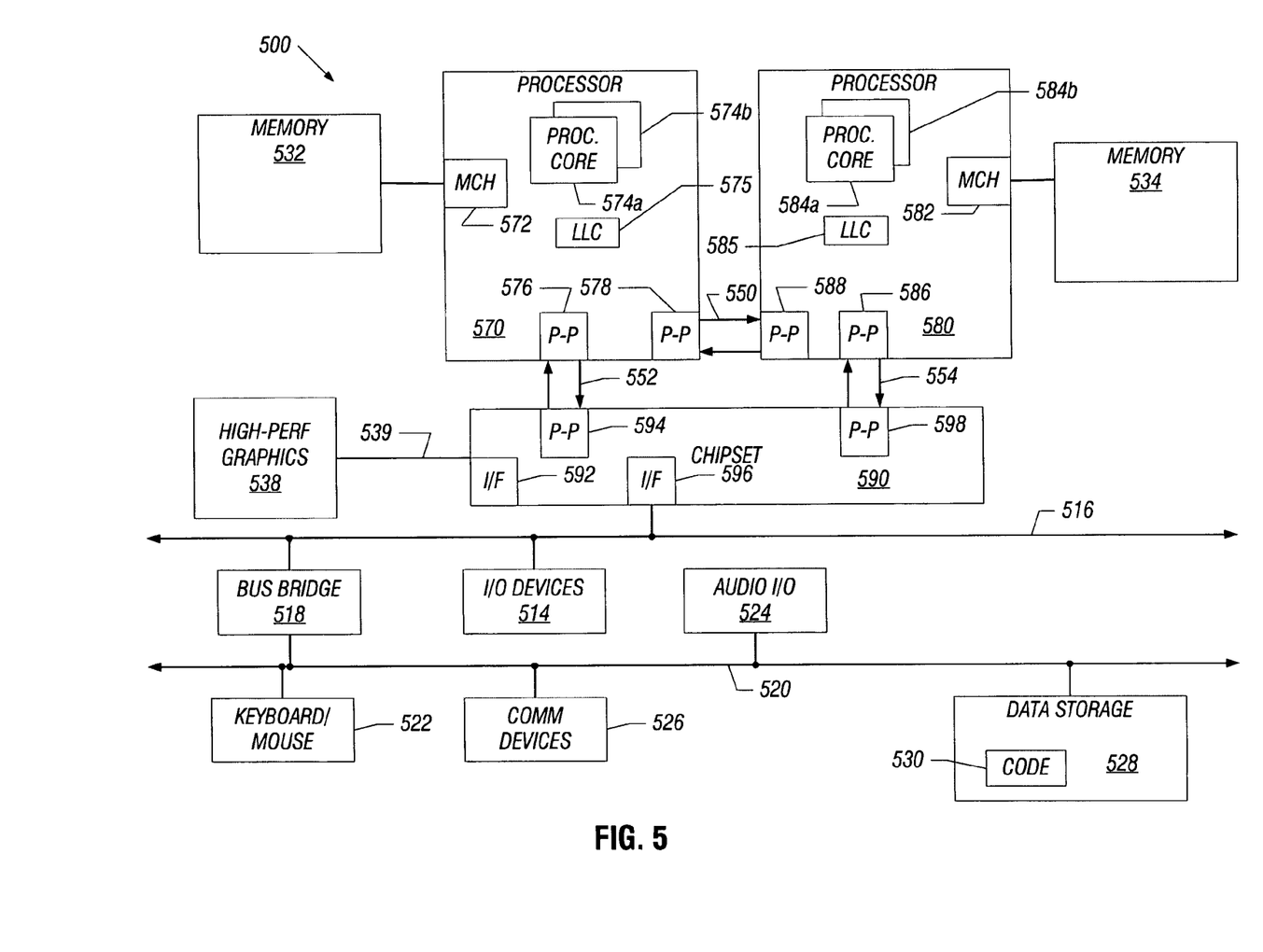
FIG. 5 is a block diagram of a multiprocessor system in accordance with an embodiment of the present invention.

Embodiments may be implemented in many different system types. Referring now to FIG. 5, shown is a block diagram of a multiprocessor system in accordance with an embodiment of the present invention. As shown in FIG. 5, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 5, each of processors 570 and 580 may be multi-core processors including first and second processor cores (i.e., processor cores 574a and 574b and processor cores 584a and 584b), although other cores and potentially many more other cores may be present in particular embodiments. While not shown in the embodiment of FIG. 5, it is to be understood that the first and second processor cores may each include one or more cache memories. Furthermore, as shown in FIG. 5 a last-level cache memory 575 and 585 may be coupled to each pair of processor cores 574a and 574b and 584a and 584b, respectively. To improve performance in such an architecture, a cache controller or other control logic within processors 570 and 580 may enable selective caching of data within a cache hierarchy including LLC's 575 and 585 and one or more caches present in processors 570 and 580. More specifically, as described above, if a given cache line evicted from a lower level cache (i.e., a cache more closely coupled to a given processor core) is a polluter cache line, the cache line may bypass one or more cache levels, e.g., within the processor cores and instead may be cached in LLC 575 or 585, for example. Of course in other embodiments, if it is determined that a cache line is a polluter line, upon eviction from a cache level, it may not be stored in any caches and instead may bypass to memory, such as a memory 532 or 534.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely memory 532 and memory 534, which may be portions of main memory locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    incrementing a counter value associated with and stored in a cache line if the cache line is inserted into a first level cache, the counter value indicative of a number of times the cache line has been inserted into the first level cache; and
    storing the cache line including the counter value into a second level cache coupled to the first level cache or a third level cache coupled to the second level cache based on the counter value, after eviction from the first level cache, wherein the cache line is stored into the second level cache if the counter value is above a threshold level indicative of whether the cache line is considered to be a polluter line, and otherwise the cache line is stored into the third level cache.

2. The method of claim 1, further comprising resetting the counter value if the cache line is evicted from the second level cache.

3. The method of claim 1, further comprising incrementing the counter value if the cache line is inserted into the first level cache from the third level cache.

4. The method of claim 1, farther comprising adjusting the threshold level based on user input.

5. The method of claim 1, further comprising incrementing the counter value when the cache line is inserted into the first level cache from a memory coupled to a multi-level cache including the first level cache and the second level cache.

6. The method of claim 1, further comprising inserting the cache line directly into the first level cache from a memory, wherein the first level cache comprises a closest cache level to a core coupled to the first level cache.

7. An apparatus comprising: a first level cache including a plurality of storage locations each to store an entry, each of the storage locations including an indicator field to store a count value indicative of a number of times the entry has been inserted into the first level cache;
    a second level cache coupled to the first level cache; and
    a third level cache coupled to the second level cache, wherein an entry, if evicted from the first level cache, is to be stored in the second level cache or the third level cache based on the count value in the indicator field of the corresponding storage location, wherein the entry is to be stored in the second level cache if the count value is greater than a threshold level indicative of where the entry is considered to be a polluter, otherwise the entry is to be stored in the third level cache.

8. The apparatus of claim 7, wherein the first level cache comprises a closest cache to a processor core, and the second level cache comprises a mid-level cache.

9. The apparatus of claim 8, wherein the apparatus comprises a multi-level cache having an exclusive storage policy.

10. The apparatus of claim 7, wherein the count value is to saturate if an entry has been inserted into the first level cache a threshold number of times.

11. The apparatus of claim 7, wherein an entry is to bypass storage in the second level cache if evicted from the first level cache and the count value is less than a threshold.

12. The apparatus of claim 7, wherein the apparatus is to reset the count value of an entry if the entry is evicted from the second level cache without being inserted into the first level cache.

13. The apparatus of claim 7, further comprising a cache controller to move an entry evicted from the first level cache to the second level cache or a more distant cache based on the count value.

14. The apparatus of claim 13, wherein the cache controller is to reset the count value if the entry is evicted from the second level cache after eviction from the first level cache, and is not again inserted into the first level cache.

15. An article comprising a machine-readable storage medium including instructions that when executed by a machine enable the machine to perform a method comprising:
    determining a value of a counter associated with and stored in a cache line if the cache line is evicted from a first cache;
    storing the cache line including the counter in a second cache coupled to the first cache if the value is at least equal to a threshold, and instead bypassing storage in the second cache and storing the cache line including the counter in a third cache coupled to the second cache if the value is less than the threshold;
    updating the value of the counter when the cache line is inserted into the first cache; and directly inserting the cache line into the first cache from a memory, wherein the second cache is closer to the memory.

16. The article of claim 15, wherein the method further comprises resetting the value of the cache line if the cache line is evicted from the second cache without being inserted into the first cache.

17. The article of claim 15, wherein the method further comprises adjusting the threshold based on user input.

18. The article of claim 15, wherein the method further comprises incrementing the value when the cache line is inserted into the first cache from the memory.

19. A system comprising:
a first cache level memory having a plurality of storage elements each including a first counter field to identify a number of times data stored in the corresponding storage element has been written into the first cache level memory;
a second cache level memory coupled to the first cache level memory, wherein the second cache level memory is to store a cache line of the corresponding storage element after eviction from the first cache level memory if a comparison of a value of the first counter field of the corresponding storage element to a threshold value indicates that the cache line is not a polluter line;
a third cache level memory coupled to the second cache level memory, wherein the third cache level memory is to store the cache line of the corresponding storage element after eviction from the first cache level memory if the comparison indicates that the cache line is a polluter line; and
a dynamic random access memory (DRAM) coupled to the second cache level memory.

20. The system of claim 19, further comprising a multi-level cache including the first cache level memory and the second cache level memory, wherein the multi-level cache comprises an exclusive storage policy cache.

21. The system of claim 19, further comprising a cache controller to directly write data into a corresponding storage element of the first cache level memory from the DRAM.

22. The system of claim 19, further comprising a processor including a multi-level cache hierarchy having the first cache level memory and the second cache level memory.

\* \* \* \* \*

UNITED STATES PATENT AND TRADEMARK OFFICE
CERTIFICATE OF CORRECTION

PATENT NO. : 7,596,662 B2  Page 1 of 1
APPLICATION NO. : 11/513554
DATED : September 29, 2009
INVENTOR(S) : Makineni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 280 days.

Signed and Sealed this

Twenty-eighth Day of September, 2010

David J. Kappos
*Director of the United States Patent and Trademark Office*